No. 715,645. Patented Dec. 9, 1902.
J. L. DINKELSPIEL.
FASTENER FOR GLOVES, &c.
(Application filed Feb. 19, 1902.)
(No Model.)
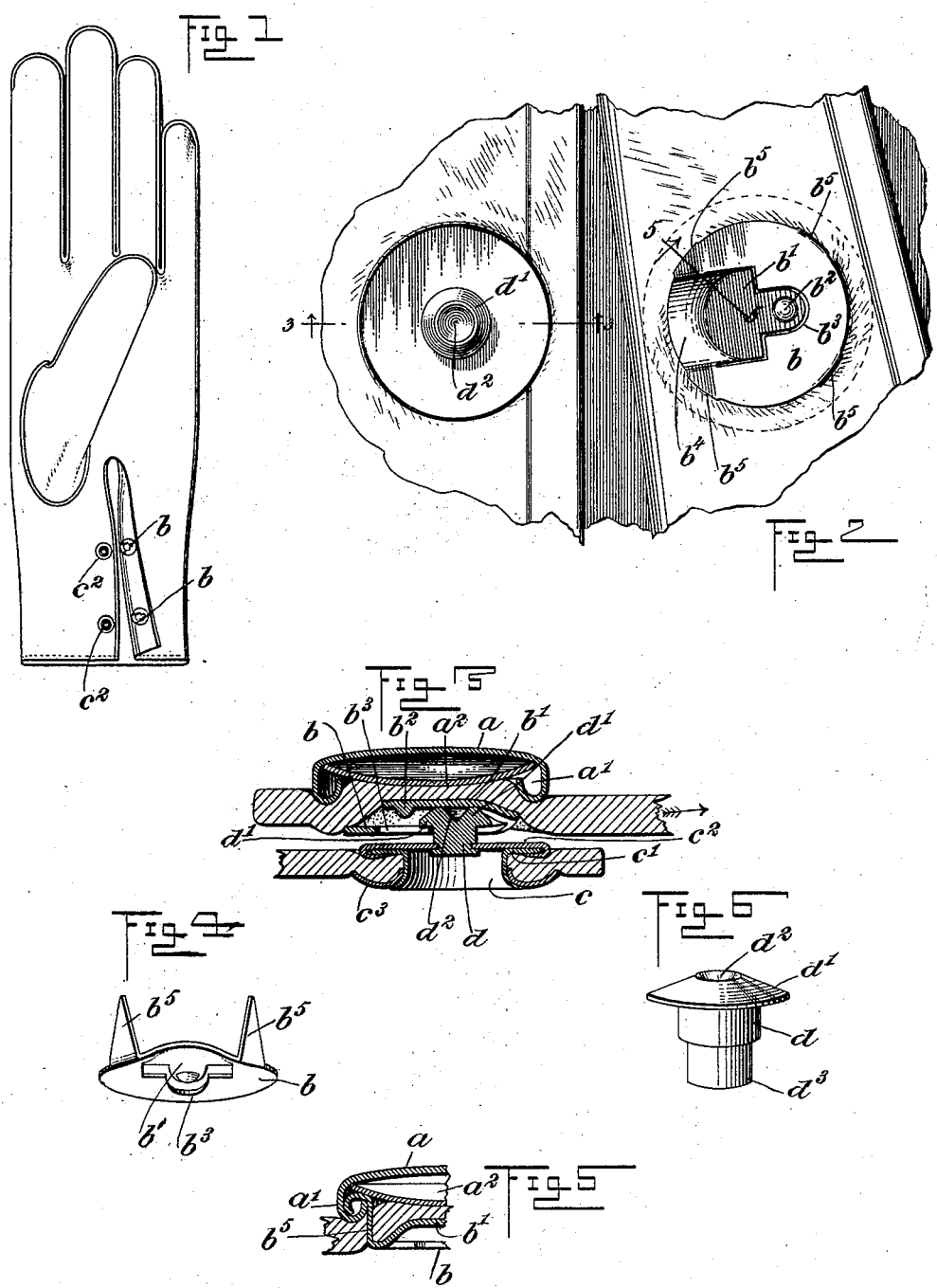
WITNESSES:
INVENTOR
Joseph L. Dinkelspiel
BY
ATTORNEYS

UNITED STATES PATENT OFFICE.

JOSEPH L. DINKELSPIEL, OF NEW YORK, N. Y.

FASTENER FOR GLOVES, &c.

SPECIFICATION forming part of Letters Patent No. 715,645, dated December 9, 1902.

Application filed February 19, 1902. Serial No. 94,767. (No model.)

*To all whom it may concern:*

Be it known that I, JOSEPH L. DINKELSPIEL, a citizen of the United States, and a resident of the city of New York, borough of Manhattan, in the county and State of New York, have invented a new and Improved Fastener for Gloves and other Articles, of which the following is a full, clear, and exact description.

This invention relates to a fastener for two parts of a garment or other cloth, leather, or other structures. It is particularly intended as a glove-fastener, since its construction renders it especially applicable to this class of garments. Broadly stated, the fastener is made up of a socket member and a stud member carried, respectively, on the parts to be joined together. The socket member comprises a thumb-cap and a socket-plate, the latter having pliable spurs which are forced through the material of which the glove is formed and caused to curl into the thumb-cap, thus fastening the thumb-cap and socket-piece firmly together and to the glove. The stud member comprises a thimble to which a cap or stud plate is fastened, the thimble being driven through the material of the glove and expanded over a thimble-ring, whereby to fasten the parts in place and properly hold the stud, which itself is carried on the cap-plate.

My invention resides in certain novel features of construction and relative arrangement of parts, which will be fully pointed out hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a view of a glove, showing my invention applied. Fig. 2 is an enlarged view showing the outer or stud side of the stud member and the inner or socket side of the socket member, the parts of the fastener being disengaged. Fig. 3 is an enlarged section taken on the line 3 3 of Fig. 2, the parts of the fastener being engaged. Fig. 4 is a perspective view showing the form of the socket-plate. Fig. 5 is a sectional view on the line 5 5 of Fig. 2, and Fig. 6 is a view of the stud before it is fastened into the stud member.

The thumb-cap of the socket member is formed of a top or body plate $a$, preferably circular in form and having its edges turned laterally and thence returned to form a channel-flange $a'$. Within the top or body plate $a$ is a concavo-convex disk $a^2$, which is fitted in the top or body plate before the flange $a'$ is formed and which has its convex face on the inner side of the thumb-cap. The body-plate $a$ is also slightly bulged outward, and these parts $a$ and $a^2$ being thus arranged form an extremely strong construction.

$b$ indicates the socket-plate, which with the thumb-cap forms the socket member of the fastener. The socket-plate, as best shown in Figs. 2, 3, and 4, has a tongue $b'$ stamped therefrom, such tongue terminating in a contracted studded portion $b^2$. The act of forming this tongue $b'$ forms a socket-like slot in the plate $b$, which slot terminates in a contracted part $b^3$, adapted to hold the stud of the stud member when the parts of the fastener are engaged. This contracted part $b^3$ or the socket proper lies at one side of the center or middle of the socket-plate, as shown in Fig. 2. The tongue $b'$ lies inward toward the cap-plate, (see Fig. 3,) and the material of the socket-plate at the base of the tongue $b'$, at which point the tongue joins the socket-plate, is swaged in, as indicated at $b^4$, so that this swaged part $b^4$ lies very near to the plane of the tongue. The socket-plate is formed on its periphery with a number of spurs $b^5$. The spurs $b^5$ are preferably spaced equidistant around the periphery of the socket-plate and are preferably four in number. (See Fig. 2.) Of these spurs two are located one at each side of the swaged-in part $b^4$ and directly adjacent to the base of the tongue $b'$. Ordinarily the socket-plate would be weakest at this point—namely, at the base of the tongue $b'$—and by locating the spurs $b^5$ at these points the socket-plate is reinforced and given all necessary strength. Therefore in addition to their other functions the spurs perform the service of strengthening the socket-plate at points which otherwise would be weakened by the formation of the tongue $b'$ and swage $b^4$.

In assembling the parts of the socket member the thumb-cap is placed on the outer side of the material and the socket-plate is placed on the inner side with its spurs $b^5$ projecting toward the garment. The parts are so shaped relatively to each other that the spurs $b^5$ will lie directly opposite the inner sides of the channel-flanges $a'$, and then when the thumb-cap and socket-plate are forced together by a suitable press or by other means the spurs $b^5$ pass through the garment and strike against the convex plate $a^2$ of the thumb-cap. The convex plate turns the spurs outward and causes them to curl up inside of the channel-flange. This fastens the parts of the socket member securely together, and they assume the positions relatively to each other shown in Fig. 3. Fig. 5 shows the manner in which the spurs are curled up in the channel-flange.

The stud member comprises a thimble $c$, which is formed at its inner end with an outwardly-projecting annular flange $c'$, and over this flange is fastened the cap or stud plate $c^2$, such connection being effected by turning down the edges of the stud-plate and clamping them around the flange $c'$. The stud-plate extends across the thimble and carries the stud $d$ centrally of the plate and thimble. The thimble $c$ is forced through the material, as shown, and its outer or lower end is swaged out around a thimble-ring $c^3$, thus securely fastening the thimble and the stud-plate in the positions shown. The stud comprises a shank or body and a head $d'$ of essentially frusto-conical form and having a pit or cavity $d^2$ in its top. In constructing the stud member the stud is formed separately from the other parts after the manner of a rivet, as shown in Fig. 6, and its reduced extension $d^3$ of the shank is first passed through an opening in the stud-plate and then upset or riveted in place, as shown in Fig. 3.

The two parts of the fastener are connected together by causing the stud to be entered into the socket or slot in the socket-plate. Fig. 3 shows the parts in the act of engagement, and in this view let it be assumed that the socket member is being movable relatively to the stud member in the direction of the arrow. As the socket member is moved toward the stud member the stud enters under the swaged part $b^4$ of the socket-plate and passes along the tongue until the studded extremity $b^2$ of the tongue snaps into the pit or cavity $d^2$, and the shank of the stud will then be held in the contracted portion or socket proper, $b^3$, of the plate $b$. The swaged portion $b^4$ allows the easy entrance of the stud into the socket and avoids any possible movement of the parts toward each other in the line of the axis of the stud. The tongue $b'$ holds the stud properly engaged, and owing to the eccentric position of the end portion of the slot or socket $b^3$ in the plate $b$ the pull of the stud on the socket member is even and the engagement between the parts is rendered more secure—in other words, this eccentric positioning of the parts causes the pull to be in a straight line across the true center of the socket member and avoids any wabbling of the socket member relatively to the stud member, which wabbling would tend to dislocate the stud.

Various changes in the form and details of my invention may be resorted to at will without departing from the spirit of my invention. Hence I consider myself entitled to all such changes as may lie within the intent of my claims.

Having thus described my invention, I claim as new and desire to secure by Letters Patent—

1. A garment or other fastener, comprising a socket-plate having a tongue stamped therefrom, the socket-plate being swaged in at the base of the tongue, for the purpose specified, and spurs formed on the periphery of the socket-plate, two of said spurs being located one at each side of the said swaged-in part of the socket-plate and directly adjacent to the base of the tongue therein.

2. A socket member for garment or other fasteners, comprising a top or body plate having its edges turned laterally and thence returned to form a channel-flange, a concavo-convex disk fitted in the top or body plate and having its concave face adjacent to the top or body plate and the edges of the said disk being projected beyond the returned portion of the said channel-flange, and a socket-plate having a tongue thereon and having pliable spurs formed on its edges, said spurs being curled up inside of the channel-flange.

3. A socket member for garment or other fasteners, comprising a top or body plate having its edges turned laterally and thence returned to form a channel-flange, a concavo-convex disk fitted in the top or body plate and having its concave face adjacent to the top or body plate and the edges of the said disk being projected beyond the returned portion of the said channel-flange, and a socket-plate having a tongue thereon and having pliable spurs formed on its edges, said spurs being curled up inside of the channel-flange, and the said socket-plate being swaged in at the base of the tongue and two of the said spurs being located one at each side of the swaged-in part and directly adjacent to the base of the tongue.

4. A garment-fastener, comprising a socket member and a stud member, the socket member being formed of a top or body plate having its edges turned laterally and thence returned to form a channel-flange, a concavo-convex disk fitted in the top or body plate and having its edges extended past the returned portion of the flange thereof, and a socket-plate having a tongue stamped thereon, the socket-plate also having a swaged-in part at the base of the tongue and the socket-plate further having pliable spurs formed on its edges, two of its spurs being located one at each side of the swaged-in part directly adjacent to the base of the tongue and said spurs being curled up in the annular flange of the top plate, whereby to secure the socket-plate, the stud member comprising a thimble with an outwardly-projected annular flange at its inner end, a cap or stud plate fastened to said flange, a stud carried by the stud-plate, for the purpose specified, and a thimble-ring encircling the lower portion of the thimble and having said portion of the thimble swaged out around the ring, to hold the thimble-ring in position.

In testimony whereof I have signed my name to this specification in the presence of two subscribing witnesses.

JOSEPH L. DINKELSPIEL.

Witnesses:
I. B. OWENS,
JNO. M. RITTER.